US012330930B2

(12) United States Patent
Ingraham

(10) Patent No.: US 12,330,930 B2
(45) Date of Patent: Jun. 17, 2025

(54) ARTICULATING SADDLE AND METHODS OF MAKING SAME

(71) Applicant: Challen Ingraham, Tabernacle, NJ (US)

(72) Inventor: Challen Ingraham, Tabernacle, NJ (US)

(*) Notice: Subject to any disclaimer, the term of this patent is extended or adjusted under 35 U.S.C. 154(b) by 0 days.

(21) Appl. No.: 17/938,740

(22) Filed: Oct. 7, 2022

(65) Prior Publication Data

US 2024/0116747 A1 Apr. 11, 2024

(51) Int. Cl.
*B68C 1/04* (2006.01)
*B68C 1/02* (2006.01)

(52) U.S. Cl.
CPC ................ *B68C 1/04* (2013.01); *B68C 1/025* (2013.01); *B68C 2001/042* (2013.01)

(58) Field of Classification Search
CPC ..... B68C 1/025; B68C 2001/042; B68C 1/04; B68C 1/02
See application file for complete search history.

(56) References Cited

U.S. PATENT DOCUMENTS

| | | | | |
|---|---|---|---|---|
| 6,769,233 B2 | 8/2004 | Hadlock | | |
| 2009/0320419 A1* | 12/2009 | Revheim | B68C 1/04 54/44.3 | |
| 2011/0258974 A1 | 10/2011 | Brander et al. | | |

FOREIGN PATENT DOCUMENTS

| | | | | |
|---|---|---|---|---|
| DE | 102004022048 A1 | 11/2005 | | |
| DE | 102014017363 A1 * | 5/2016 | B68C 1/025 | |
| EP | 2559653 A1 * | 2/2013 | B68C 1/04 | |
| EP | 3283432 B1 | 5/2020 | | |
| GB | 2423230 A * | 8/2006 | B68C 1/025 | |
| WO | WO-2006083174 A1 * | 8/2006 | B68C 1/02 | |
| WO | WO-2016166351 A1 * | 10/2016 | B68C 1/02 | |
| WO | WO-2021209347 A1 * | 10/2021 | B68C 1/02 | |
| WO | WO-2021245252 A1 * | 12/2021 | B68C 1/025 | |

* cited by examiner

*Primary Examiner* — Peter M Poon
*Assistant Examiner* — Carly W. Lynch
(74) *Attorney, Agent, or Firm* — SLEMAN & LUND LLP

(57) ABSTRACT

In some examples, a saddle tree having a longitudinal axis, a proximal end and a distal end, the saddle tree includes a proximal-most segment, a distal-most segment, at least one intermediate segment disposed between the proximal-most segment and the distal-most segment, a first articulation mechanism coupling each of the at least one intermediate segment to proximal ones, and a second articulation mechanism coupling each of the at least one intermediate segment to distal ones.

15 Claims, 3 Drawing Sheets

ARTICULATING SADDLE AND METHODS OF MAKING SAME

FIELD OF THE DISCLOSURE

The present disclosure relates to an articulating riding saddle and a pad for a riding saddle having a contoured shape to provide for continuous, conforming, supportive contact between the saddle and the back of a horse.

BACKGROUND OF THE DISCLOSURE

Traditional saddles have a solid backbone or "tree", made of wood (more recently materials have included fiberglass, metal and plastic), round which leather (or synthetic equivalent) is mounted. Inevitably such a rigid structure placed on a moving surface raises difficulties with the fit of the saddle to the horse. In the case of the military and western saddles this is partially addressed by using a thick saddle blanket. However, with close contact saddles the issue is addressed by attention to fit, either by having a bespoke saddle made for the horse (which is very expensive), or by careful selection from a range of off the peg designs. It is estimated that a saddlery wishing to carry a basic range of off the peg saddles, covering the three main saddle styles (dressage, jumping, general purpose), in one single color option, and to fit most sizes of horse and rider, would have to stock in excess of 72 different saddles.

Even when a rider invests in a bespoke saddle, the traditional, static design based on a rigid tree does not allow for the changes in a horse's shape that occur as it moves, or as there are variations in its fitness. Even the best fitting saddle cannot distribute the pressure evenly throughout the range of a horse's movement, and even a well-fitting treed saddle will inevitably create pressure points on the horse's back, especially when turning tightly, where the saddle tree acts somewhat as a splint longitudinally on the spine, or when riding up or down hill or jumping, where the load is focused by the tree towards the front or back of the saddle. This can cause pain and restrict movement, and can potentially leading to a range of physiological and behavioral problems such as bucking, rearing, lameness, bruising of the muscles, muscular atrophy and in more severe cases, tissue necrosis.

Over the last thirty years several new designs of saddle have been developed, both to try to address the problems enumerated above, and to facilitate newly evolved riding disciplines such as endurance and vaulting. Most still use a static method of mounting the saddle on the horse. Many of these new designs are described as "treeless", but in practice most are semi-treed, in that they have a rigid internal fitting at either the pommel or the cantle of the saddle. This can lead to weight being distributed over fewer points than a standard tree, which, in some circumstances, can exacerbate the problem. Saddles that have no tree at all do nothing to spread the pressure of the girth and the stirrups, the full force of which is therefore concentrated immediately over the mounting points. There is also a perception that such saddles are not as secure on the horse, as many treeless designs do not include a gullet, which has the effect of reducing lateral stability. A further disadvantage of many such saddles is that it is difficult to design them to look like the traditional English saddle, a look that is very popular in the market.

Thus, the present disclosure addresses the issues of comfort and the stability of the saddle when the horse is moving. Conventional devices suffer from several shortcomings such as those described above.

SUMMARY OF THE DISCLOSURE

In some examples, a saddle tree having a longitudinal axis, a proximal end and a distal end, the saddle tree includes a proximal-most segment, a distal-most segment, at least one intermediate segment disposed between the proximal-most segment and the distal-most segment, a first articulation mechanism coupling each of the at least one intermediate segment to proximal ones, and a second articulation mechanism coupling each of the at least one intermediate segment to distal ones.

BRIEF DESCRIPTION OF THE DISCLOSURE

Various embodiments of the presently disclosed saddle tree are shown herein with reference to the drawings, wherein.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to saddle trees and their methods of use, conventional devices suffer from some shortcomings as described above.

There therefore is a need for further improvements to the devices, systems, and methods of forming saddles. Among other advantages, the present disclosure may address one or more of these needs.

Figure 1:
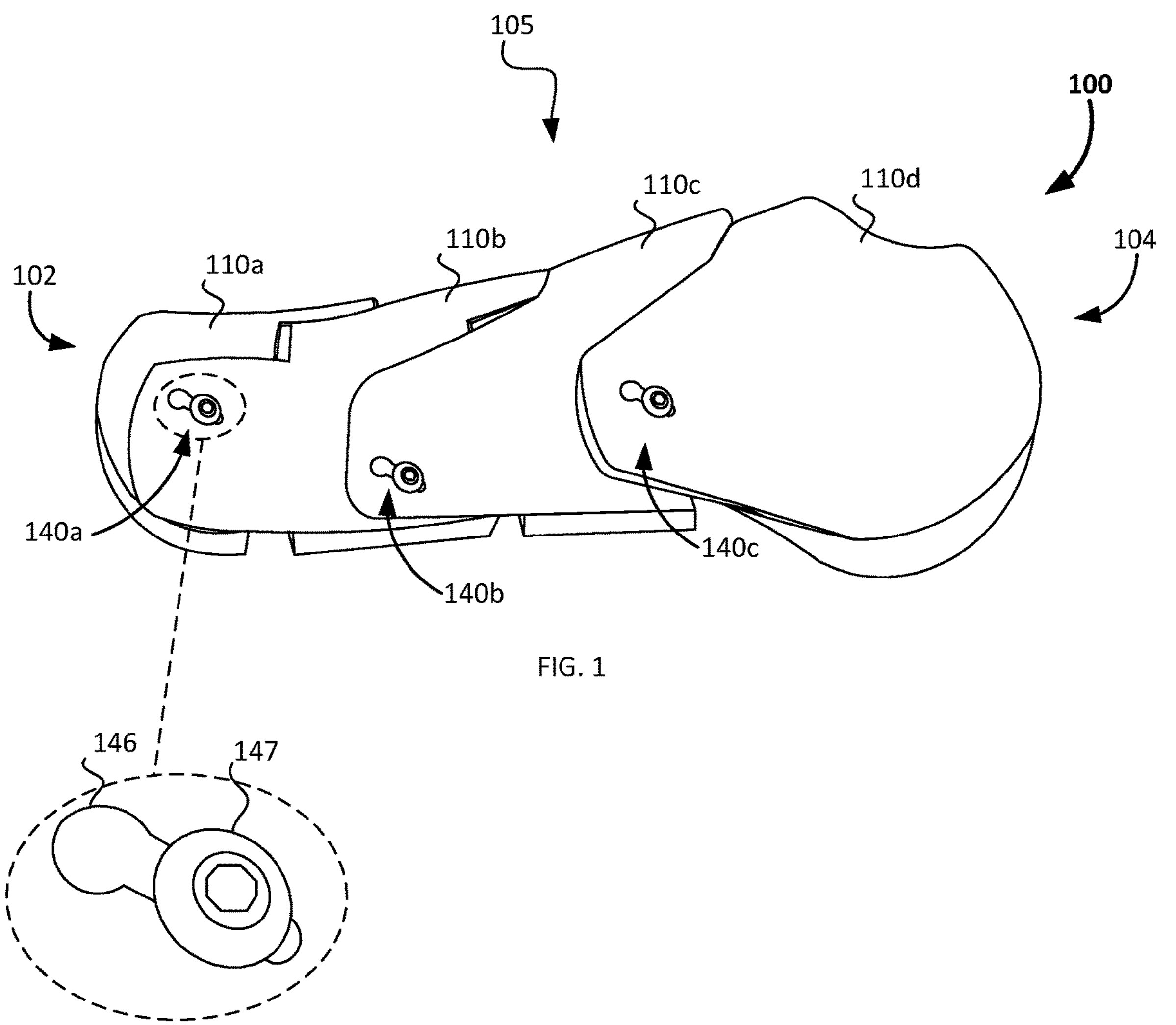
FIG. 1 is a schematic side view of one example of a saddle tree according to the present disclosure.
Figure 2:
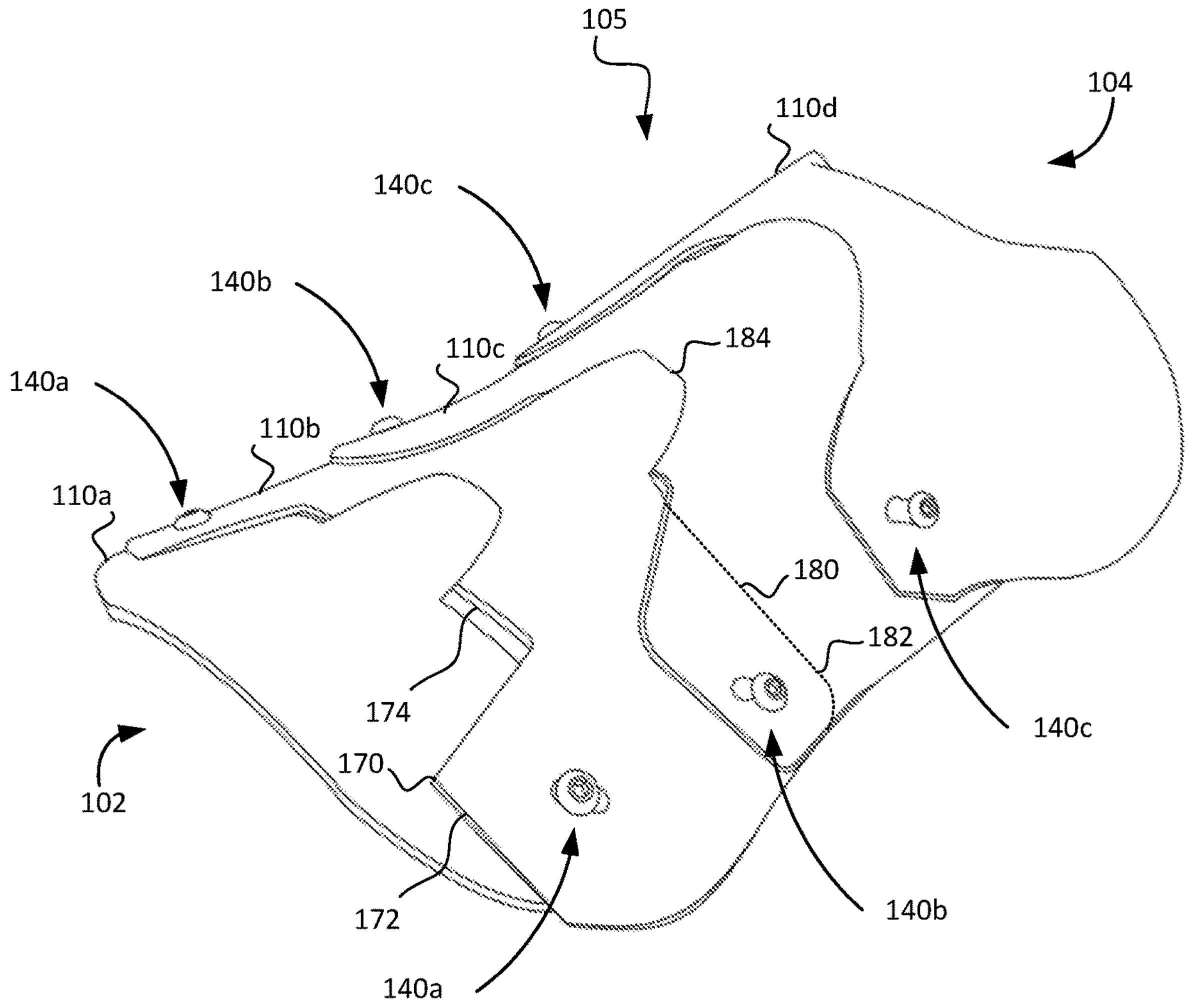
FIG. 2 is a schematic perspective view of the saddle tree of FIG. 1.
Figure 3:
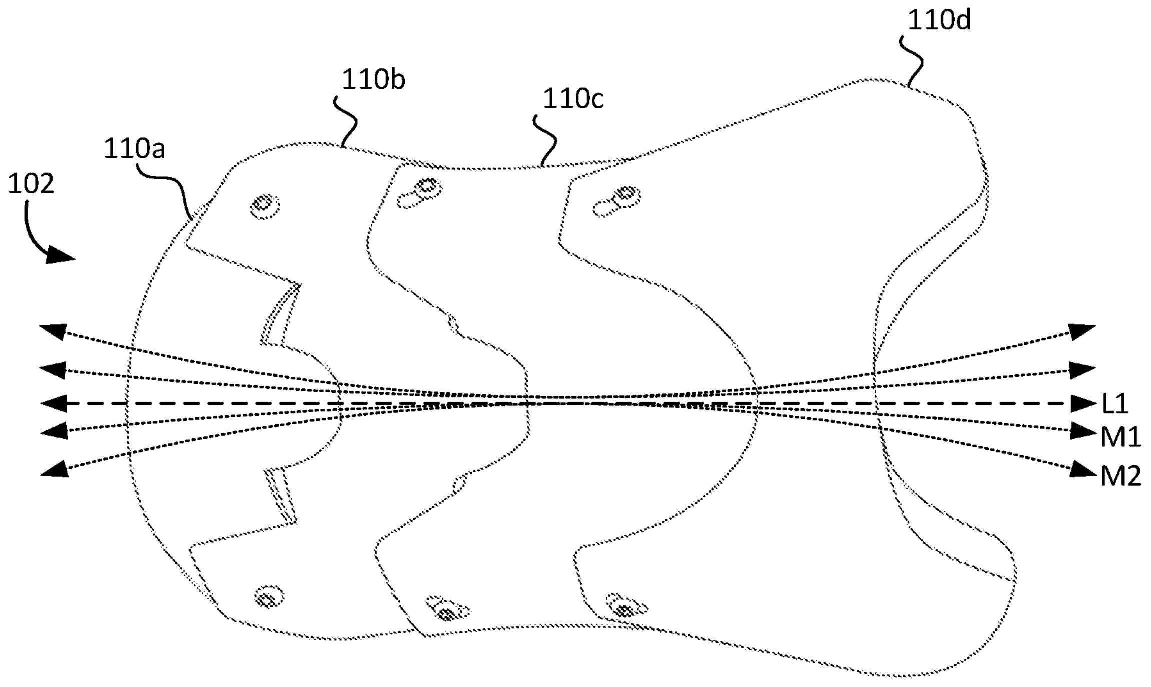
FIG. 3 is a schematic top view of the saddle tree of FIG. 1.

FIGS. 1-3 illustrate a saddle 100 having a saddle tree 105 that extends between a proximal end 102 and a distal end 104, the saddle tree 105 having a longitudinal axis L1 and being symmetric about the longitudinal axis L1. In the example shown, saddle tree 105 is formed of a plurality of segments that are capable of articulating relative to one another. Four segments are shown, although the tree may be formed of three, four, five, six or more segments. Each of the segments may comprise one or more materials including a combination of carbon fiber, metal, wood, ethylene vinyl acetate (EVA) and a copolymer. In some examples, each segment comprises a lower ethylene vinyl acetate (EVA) base (e.g., 55 durometer ethylene vinyl acetate joined to an upper copolymer and each segment is encased or coated with carbon Kevlar or a similar suitable fabric.

Specifically, saddle tree 105 may include a proximal-most segment 110*a*, at least one intermediate segment (two segments are shown and labeled 110*b*, 110*c*), and a distalmost segment 110*d*. Each of the intermediate segments are joined to neighboring segments on its proximal end and it distal end via articulation mechanisms.

In the example shown, the proximal-most segment 110*a* is joined to segment 110*b* via a pair of articulation mechanisms 140*a* disposed on contralateral sides of the longitudinal axis L1. The pair of articulating mechanisms may be symmetric and form a mirror image about longitudinal axis L1. Intermediate segment 110*b* is joined to proximal-most segment 110*a* via articulation mechanisms 140*a* and to intermediate segment 110*c* via articulation mechanisms 140*b*. Intermediate segment 110*c* is joined to intermediate segment 110*b* via articulation mechanisms 140*b* and to distalmost segment 110*d* via articulation mechanisms 140*c*. In some examples, each of the intermediate segments are joined to two pairs of articulation mechanisms and each of the terminal (e.g., proximal-most and distal-most) segments are joined to only a single pair of articulation mechanisms.

In some examples, each of the articulation mechanisms may be in the form of a hinge or slidable member so that the two adjacent segments may move, articulate, slide, rotate and/or translate relative to one another. In the example shown, articulation mechanism 140*a* includes a slot 146 of between 4 to 1 inch formed in the upper segments and a pin 147 fixed to the lower segment, the pin being moveable within the slot. Slot 146 may be linear or curved, and the shape, length and/or curvature of the slot may affect the movement of the segments relative to one another. In some examples, the segments are capable of articulating between 5 and 10 degrees relative to one other as shown by dashed lines M1, M2 in FIG. 3. Notably, each of the segments are independently articulatable relative to adjacent ones, but the segments may bend together to form an arc M1, M2 during use.

Turning to FIG. 2, it will be readily seen that the segments 110*a*-*d* may be interleaved with one another. For examples, the segments may be above adjacent segments at certain locations and below adjacent segments at other locations. By way of illustration, intermediate segment 110*b* may have a proximal edge 170 having proximal upper portion(s) 172 disposed over proximal-most segment 110*a* and proximal lower portion(s) 174 disposed under proximal-most segment 110*a*. The upper portion(s) 172 may be disposed near the outer bounds of the segment (e.g., where the segment is widest), and the lower portion(s) 174 may be disposed toward the center along the longitudinal axis. On the opposite end of intermediate segment 110*b*, a distal edge 180 is formed having distal upper portion(s) 184 disposed over an adjacent segment and a distal lower portion(s) 182 disposed under the adjacent segment, the distal upper portion(s) 184 being disposed along the longitudinal axis, while the distal lower portion(s) 182 are disposed away from the longitudinal axis. In this manner, stability of the saddle tree is increased as each intermediate segment not only abuts adjacent segments but is disposed at least partially above and partially below others.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A saddle tree having a longitudinal axis, a proximal end and a distal end, the saddle tree comprising:

a plurality of segments, each of the plurality of segments including a medial portion and a pair of wings that extend beyond the medial portion in a direction perpendicular to the longitudinal axis, the plurality of segments including a proximal-most segment, a distal-most segment, and at least one intermediate segment disposed between the proximal-most segment and the distal-most segment, each of the pair of wings extending from the medial portion to an outermost bound farthest from the medial portion and each of the pair of wings of the plurality of segments overlapping with wings of a neighboring segment at respective outermost bounds;

first articulation mechanisms coupling each of the at least one intermediate segment to a more proximal segment; and second articulation mechanisms coupling each of the at least one intermediate segment to a more distal segment;

wherein each of the first articulation mechanisms and the second articulation mechanisms comprises a pair of contralateral articulating hinges that couple respective wings of one of the proximal-most segment, the distal-most segment and the at least one intermediate segment to respective wings of an adjacent segment.

2. The saddle tree of claim 1, wherein the at least one intermediate segment comprises a single intermediate segment.

3. The saddle tree of claim 1, wherein the at least one intermediate segment comprises two intermediate segments.

4. The saddle tree of claim 1, wherein each of the pair of contralateral articulating hinges comprises a slot and a pin.

5. The saddle tree of claim 1, wherein the at least one intermediate segment is interleaved with adjacent segments.

6. The saddle tree of claim 1, wherein the at least one intermediate segment includes a proximal edge having a proximal upper portion disposed over an adjacent segment and a proximal lower portion disposed under the adjacent segment.

7. The saddle tree of claim 6, wherein the proximal upper portion is disposed away from the longitudinal axis, and the proximal lower portion is disposed along the longitudinal axis.

8. The saddle tree of claim 1, wherein the at least one intermediate segment includes a distal edge having a distal upper portion disposed over an adjacent segment and a distal lower portion disposed under the adjacent segment.

9. The saddle tree of claim 8, wherein the distal upper portion is disposed along the longitudinal axis, and the distal lower portion is disposed away from the longitudinal axis.

10. The saddle tree of claim 1, wherein each of the proximal-most segment, the distal-most segment and the at least one intermediate segment comprises one of carbon fiber, metal or wood.

11. The saddle tree of claim 1, wherein each of the proximal-most segment, the distal-most segment and the at least one intermediate segment comprises ethylene vinyl acetate.

12. The saddle tree of claim 1, wherein each of the proximal-most segment, the distal-most segment and the at least one intermediate segment comprises a copolymer.

13. The saddle tree of claim 1, wherein the plurality of segments are configured and arranged so that there are no gaps between neighboring pairs of wings.

14. The saddle tree of claim 1, wherein each of the pair of wings is widest at its respective outermost bound.

15. A saddle tree having a longitudinal axis, a proximal end and a distal end, the saddle tree comprising:

a plurality of segments, each of the plurality of segments including a medial portion and a pair of wings that extend beyond the medial portion in a direction perpendicular to the longitudinal axis, the plurality of segments including a proximal-most segment, a distal-most segment, and at least one intermediate segment disposed between the proximal-most segment and the distal-most segment, each of the pair of wings extending from the medial portion to an outermost bound farthest from the medial portion and each of the pair of wings of the plurality of segments overlapping with wings of a neighboring segment at respective outermost bounds;

first articulation mechanisms coupling each of the at least one intermediate segment to a more proximal segment; and second articulation mechanisms coupling each of the at least one intermediate segment to a more distal segment;

wherein each of the first articulation mechanisms and the second articulation mechanisms comprises a pair of contralateral articulating hinges that couple one of the proximal-most segment, the distal-most segment and the at least one intermediate segment to an adjacent segment.

* * * * *